(12) United States Patent
Stanczak

(10) Patent No.: US 6,676,227 B1
(45) Date of Patent: Jan. 13, 2004

(54) METALLIC DEBRIS EXTRACTOR

(75) Inventor: Edmund A. Stanczak, St. Clair Shores, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 23 days.

(21) Appl. No.: 09/691,532

(22) Filed: Oct. 18, 2000

(51) Int. Cl.⁷ .............................................. B60B 35/00
(52) U.S. Cl. .................. 301/108.1; 301/108.2
(58) Field of Search .................. 301/108.1, 108.2, 301/108.3, 108.4, 124.1; 184/6.25; 210/222

(56) References Cited

U.S. PATENT DOCUMENTS

| | | | |
|---|---|---|---|
| 2,214,268 A | * 9/1940 | Brooks | 210/222 |
| 2,622,942 A | 12/1952 | Munoz | |
| 2,704,156 A | * 3/1955 | Botstiber | 210/222 |
| 3,367,722 A | 2/1968 | Miyanaga | |
| 4,834,464 A | 5/1989 | Frehse | |
| 4,851,116 A | * 7/1989 | Tomita | 184/6.25 X |
| 5,294,350 A | 3/1994 | Murphy et al. | |
| 5,538,330 A | * 7/1996 | Ehrlich | 301/124.1 |
| 5,860,708 A | * 1/1999 | Borders et al. | 301/108.1 |
| 6,024,417 A | * 2/2000 | Jones, II et al. | 301/124.1 |

* cited by examiner

Primary Examiner—Russell D. Stormer
(74) Attorney, Agent, or Firm—Carlson, Gaskey & Olds

(57) ABSTRACT

An axle end plug employs a magnet which attracts ferrous metallic debris from a cavity in a trailer axle wheel end. The axle end plug includes a vent hole which is substantially aligned with an aperture in the magnet. The vent hole vents the cavity in the trailer axle wheel end to the interior of the axle, rather than to the atmosphere. The arrangement prevents external contaminants such as dirt and water from entering the cavity. The magnet attracts ferrous debris which accumulates in the cavity from component wear or from manufacturing debris which remains in the axle interior. The magnet attracts and removes these particles from the trailer axle wheel end, minimizing the wearing of components.

10 Claims, 2 Drawing Sheets

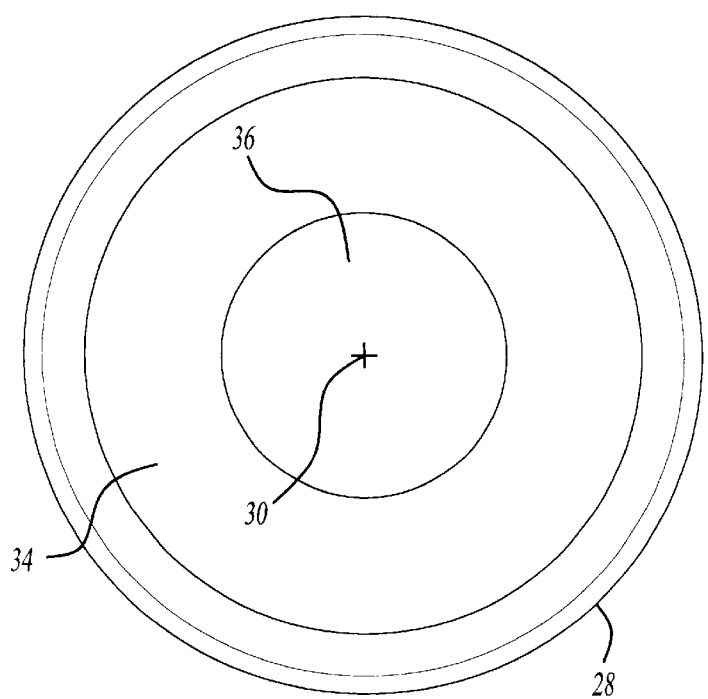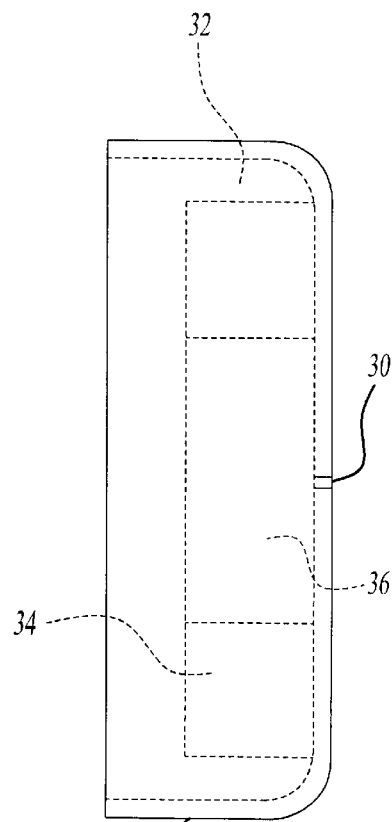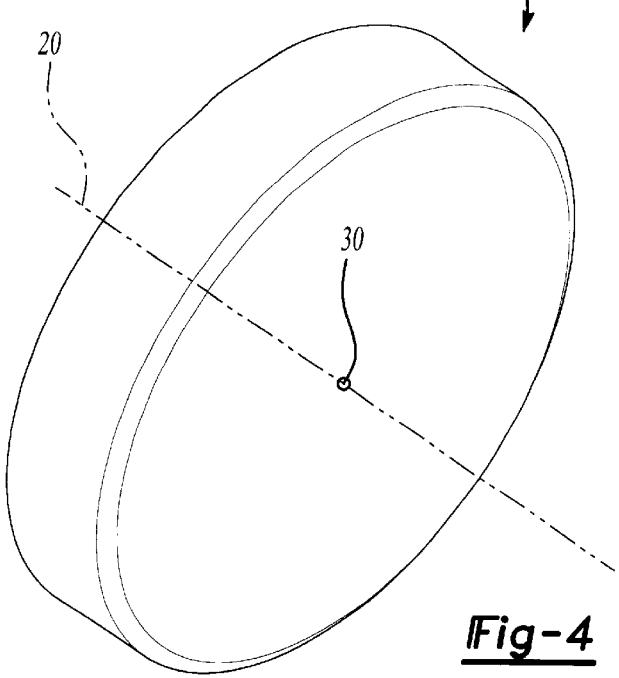

METALLIC DEBRIS EXTRACTOR

BACKGROUND OF THE INVENTION

The present invention relates generally to a metallic debris extractor for use with a trailer axle wheel end.

Ferrous metallic debris builds up in lubricant in the axle wheel end cavity during vehicle operation. This debris accumulates due to the constant wear of moving components in the wheel end, chipping from casting flaws, and residue which remains in the axle interior from manufacturing.

During vehicle operation, the temperature and pressure within the axle wheel end cavity increases. The wheel end is vented to prevent an increase in the pressure in the wheel end cavity.

In a prior design, the wheel end is vented to the atmosphere by a hole located in the hubcap rubber fill plug. The vent hole vents the cavity to the atmosphere to regulate the pressure within the cavity. However, because the hole is exposed to the environment, outside debris, dirt and water can enter into the cavity through the vent hole, further contaminating the lubricant in the cavity.

Venting can also be accomplished by positioning a vent hole in the axle end plug, which vents the wheel end cavity to the interior of the axle. This prevents outside contaminants from entering the cavity. However, ferrous metallic debris which remains in the axle interior from the manufacturing process can enter the wheel end through the vent hole, further contaminating the lubricant in the cavity.

The presence of these abrasive metallic particles in the lubricant can cause excessive wear to the components in the wheel end. Therefore, it is desirous that they be removed.

Hence, there is a need in the art for a metallic debris extractor for use with a trailer axle wheel end.

SUMMARY OF THE INVENTION.

The present invention relates generally to a metallic debris extractor for use with a trailer axle wheel end.

In a preferred embodiment, a magnet is positioned within a recess in the axle end plug. The magnet is used to attract ferrous metallic debris which accumulates in the axle wheel end cavity. The axle end plug includes a vent hole to vent the cavity to the interior of the axle as temperature and pressure increase during operation. By venting the cavity to the interior of the axle, rather than to the environment, external contaminants such as dirt and water are prevented from entering the cavity and contaminating the lubricant located therein. Any debris which remains in the axle interior is captured by the magnetic debris extractor before it accumulates in the cavity.

However, ferrous debris also accumulates due to the normal wear of the wheel end moving parts, chipping from casting flaws in the wheel end components, and debris which may remain in the wheel end from the manufacturing process. The magnet inserted in the axle end plug also attracts this debris, removing these particles from the lubricant as the wheel end operates. It is important that these particles be removed from the lubricant because they can cause excess wear to the components over time.

The magnet includes an aperture which is aligned with the vent hole in the axle end plug to allow the trailer axle wheel end to vent.

In another embodiment of the invention, the entire axle end plug is comprised of a magnetic material. The magnetic axle end plug includes a vent hole and is inserted into the end of an axle to attract debris and prevent it from entering the cavity in the axle wheel end.

Accordingly, the present invention provides a metallic debris extractor for use with a trailer axle wheel end.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 3a illustrates a front view of the axle end plug of the present invention.

FIG. 3b illustrates a side view of the axle end plug of the present invention.

FIG. 4 illustrates an exploded view of an alternative embodiment of the axle end plug.

DETAILED DESCRIPTION OF THE PREFERRED EMBODIMENT

Figure 1:
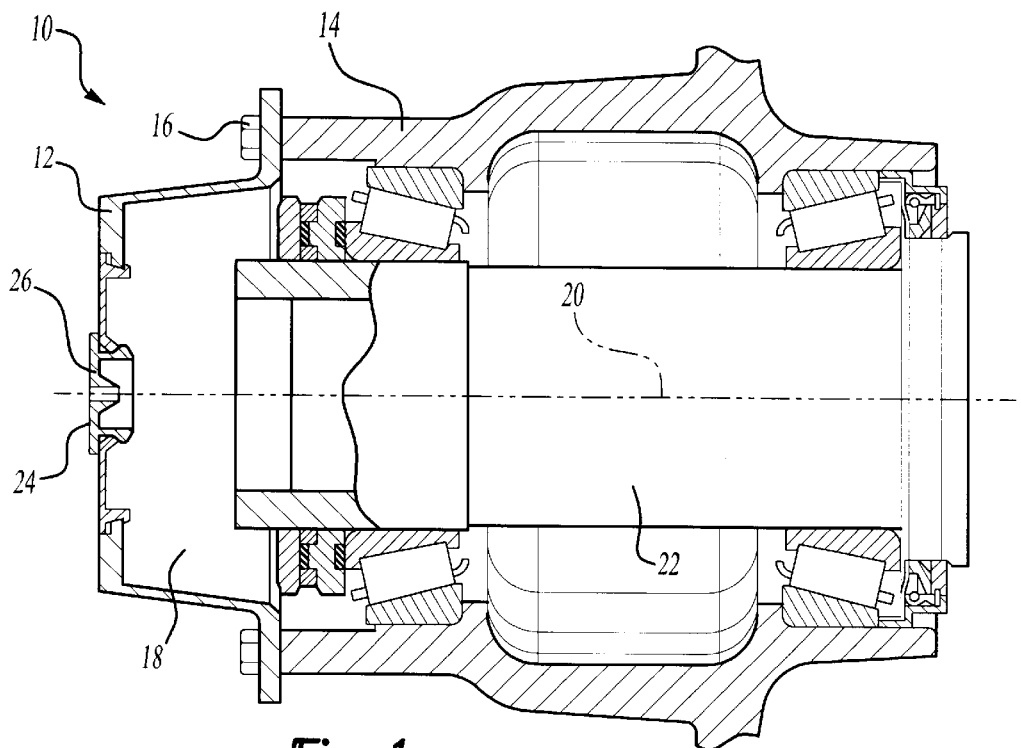
FIG. 1 illustrates a side view of a prior art trailer axle wheel end.

FIG. 1 illustrates a prior art trailer axle wheel end 10. The wheel end 10 includes a wheel hubcap 12 secured to a wheel hub 14 by a securing means, such as bolts 16. A cavity is 18 formed in the space enclosed by the wheel hub 14 and the wheel hubcap 12 and a lubricant is retained therein. An axle 22 rotates the wheel end 10 about an axis of rotation 20.

In the prior art wheel end 10 a rubber plug 24 is inserted into the wheel hubcap 12. The plug 24 includes a vent hole 26 which vents the cavity 18 to the atmosphere, preventing pressure from increasing in the cavity 18 as temperature increases during operation. However, as the vent hole 26 is located on the hubcap 12, contaminants and debris such as dirt and water can enter the cavity 18 through the vent hole 26 and cause excessive wear to the components.

Figure 2:
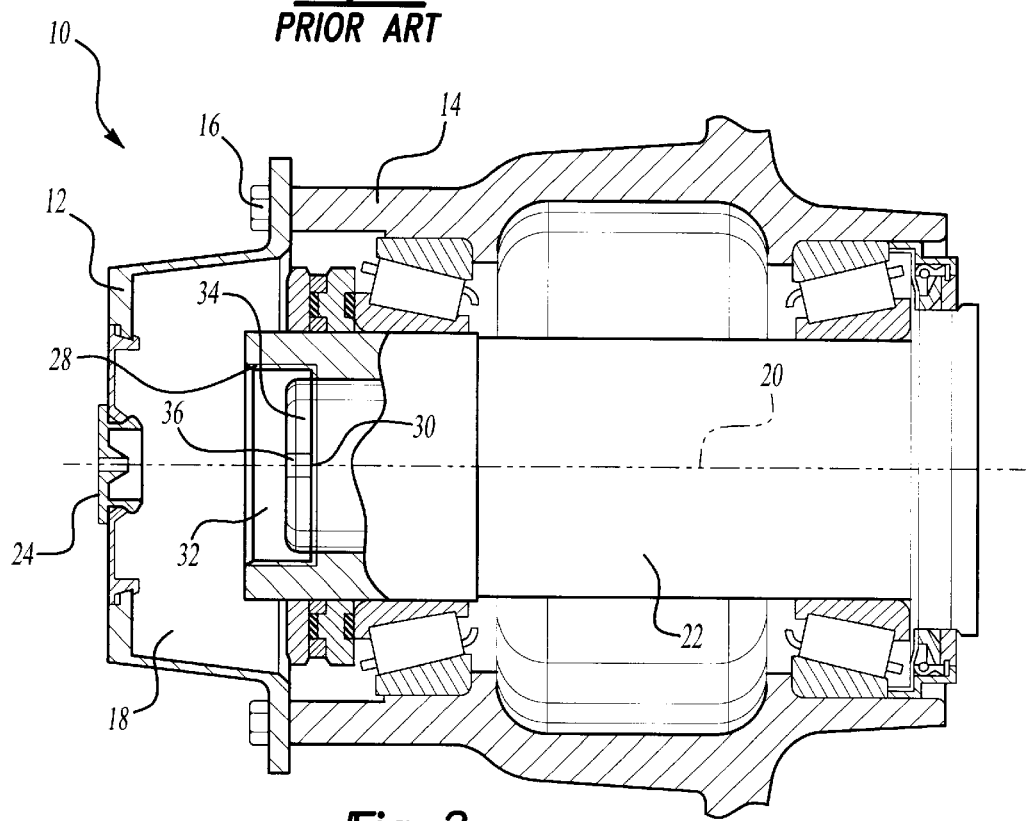
FIG. 2 illustrates a side view of a trailer axle wheel end utilizing an end plug with an inserted magnet.

FIG. 2 illustrates the trailer axle wheel end 10 of the present invention. The wheel end 10 includes an axle end plug 28 inserted into the end of the axle 22, the axle end plug 28 including a vent hole 30 located substantially in the center of the plug 28. The axle end plug 28 is steel and substantially circular in shape. The vent hole 30 vents the cavity 18 to the interior of the axle 22, rather than to the atmosphere, in order to regulate the pressure within the cavity 18. Because the cavity 18 vents to the axle 22 interior rather than to the environment, external contaminants are prevented from entering the wheel end 10.

The axle end plug 28 further includes a magnet 34. As shown in FIGS. 3a and 3b, the axle end plug 28 is substantially circular in shape and further comprises a recess 32 into which a flat round magnet 34 is inserted. The magnet 34 includes an aperture 36 located substantially in the center of the magnet 34. In the preferred embodiment, the diameter of the aperture 36 of the magnet 34 is substantially greater than the diameter of the vent hole 30 in the axle end plug 28. Additionally, the vent hole 30 and the aperture 36 are substantially aligned. The magnet 34 is preferably retained in the recess 32 in the axle end plug 28 by magnetic forces.

The magnet 34 attracts ferrous debris which accumulates from component wear and which remains in the interior of the axle 22 from manufacturing.

This invention attracts ferrous debris which accumulates in the cavity 18 from both component wear and manufacturing debris which remains in the axle 22 interior. By using a magnet 34 with an aperture 36, the axle end plug 28 can still act as a vent by venting the cavity 18 to the interior of the axle 22 through the substantially aligned aperture 36 and vent hole 30. By venting to the interior of the axle 22, rather than to the environment, contaminants such as dirt and water can be kept out of the cavity 18.

There are several advantages to utilizing a steel axle end plug 28 employing a magnet 34. For one, ferrous debris can be attracted to the magnet 34 for removal from the wheel end 10. Once debris is captured by attraction to the magnet 34, the magnet 34 can be easily removed for cleaning of the ferrous debris. The magnet 34 is also retrofitable. Additionally, by venting the cavity 18 to the interior of the axle 22, rather than to the environment, external debris can be eliminated.

FIG. 4 illustrates an alternative embodiment of the present invention. In this embodiment, as the entire axle end plug 28 is comprised of a magnetic material, the flat round magnet 34 is not employed. The axle end plug 28 also includes a vent hole 30 located substantially in the center of the axle end plug 28 to allow the cavity 18 of the axle wheel end 10 to vent to the interior of the axle 22. The magnetic axle end plug 28 attracts ferrous debris from the axle wheel end 10 to prevent wear of the components as the vehicle operates.

Accordingly, the present invention relates generally to a metallic debris extractor for use with a trailer axle wheel end.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A debris extractor for use with an axle wheel end comprising:

an axle end plug for insertion into an end of an axle, said axle end plug including a first aperture of a first diameter, a recess and a first center point; and a magnetic disc positioned and retained in said recess of said axle end plug, said magnetic disc having a second aperture of a second diameter and a second center point which is substantially aligned with said first center point of said axle end plug.

2. The debris extractor as recited in claim 1 wherein said magnetic disc is retained in said recess of said axle end plug by magnetic forces.

3. The debris extractor as recited in claim 1 wherein said second diameter of said second aperture of said magnetic disc is substantially greater than said first diameter of said first aperture of said axle end plug.

4. The debris extractor as recited in claim 1 wherein said first aperture of said axle end plug and said second aperture of said magnetic disc vent a cavity in an axle wheel end to an interior of said axle.

5. The debris extractor as recited in claim 1 wherein said axle end plug is comprised of steel.

6. An axle wheel end comprising:

a wheel hub;

a wheel hub cap attached to said wheel hub;

a cavity created by said wheel hub and said wheel hubcap;

an axle having an end and an interior;

an axle end plug inserted into said end of said axle, said axle end plug including a first aperture of a first diameter and a recess and a first center point, and a magnetic disc positioned and retained in said recess of said axle end plug, said magnetic disc having a second aperture of a second diameter and a second center point which is substantially aligned with said first center point of said axle end plug.

7. The wheel end as recited in claim 6 wherein said magnetic disc is retained in said recess of said axle end plug by magnetic forces.

8. The wheel end as recited in claim 6 wherein said second diameter of said second aperture of said magnetic disc is substantially greater than said first diameter of said first aperture of said axle end plug.

9. The wheel end as recited in claim 6 wherein said first aperture of said axle end plug and said second aperture of said magnetic disc vent said cavity in said axle wheel end to said interior of said axle.

10. The wheel end as recited in claim 6 wherein said axle end plug is comprised of steel.

* * * * *